US012783968B2

(12) United States Patent
Kandel

(10) Patent No.: US 12,783,968 B2
(45) Date of Patent: Nov. 3, 2026

(54) SYSTEMS AND METHODS FOR VIRTUAL SPACE RESERVATION IN THE METAVERSE

(71) Applicant: JPMORGAN CHASE BANK, N.A., New York, NY (US)

(72) Inventor: Stacy Newman Kandel, Easton, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 196 days.

(21) Appl. No.: 18/325,654

(22) Filed: May 30, 2023

(65) Prior Publication Data

US 2023/0419192 A1 Dec. 28, 2023

Related U.S. Application Data

(60) Provisional application No. 63/367,083, filed on Jun. 27, 2022.

(51) Int. Cl.

*G06Q 10/02* (2012.01)
*G06Q 10/0631* (2023.01)
*G06Q 10/1093* (2023.01)

(52) U.S. Cl.

CPC ....... *G06Q 10/02* (2013.01); *G06Q 10/06314* (2013.01); *G06Q 10/1093* (2013.01); *G06Q 2220/00* (2013.01)

(58) Field of Classification Search

CPC .......................... G06Q 10/0634; G06Q 10/02
See application file for complete search history.

(56) References Cited

U.S. PATENT DOCUMENTS 11,775,132 B1 * 10/2023 McDannald ........ G06F 3/04815 715/741
2022/0321371 A1 * 10/2022 Lin ......................... G06F 3/167
2023/0156052 A1 * 5/2023 Zhang ................... H04L 65/403 709/205
2023/0162179 A1 * 5/2023 Deng ................ G06Q 20/3823 705/64

* cited by examiner

*Primary Examiner* — Rutao Wu
*Assistant Examiner* — Zahra Elkassabgi
(74) *Attorney, Agent, or Firm* — GREENBERG TRAURIG LLP

(57) ABSTRACT

Systems and methods for virtual space reservation in the metaverse are disclosed. In one embodiment, a method for virtual space reservation in the metaverse may include: (1) receiving, at a virtual space scheduling computer program, a request for a virtual space in a virtual location in the metaverse or a web 3.0 location from a user; (2) identifying, by the virtual space scheduling computer program, available virtual spaces for the user; (3) receiving, by the virtual space scheduling computer program, a selection of one of the available virtual spaces for the user; (4) assigning, by the virtual space scheduling computer program, the selected virtual space to the user; and (5) granting, by the virtual space scheduling computer program, access to the selected virtual space to the user.

20 Claims, 3 Drawing Sheets

SYSTEMS AND METHODS FOR VIRTUAL SPACE RESERVATION IN THE METAVERSE

RELATED APPLICATIONS

This application claims priority to, and the benefit of, U.S. Provisional Patent Application Ser. No. 63/367,083, filed Jun. 27, 2023, the disclosure of which is hereby incorporated, by reference, in its entirety.

BACKGROUND OF THE INVENTION

1. Field of the Invention

Embodiments relate to systems and methods for virtual space reservation in the metaverse.

2. Description of the Related Art

Employees at organizations that practice hoteling may reserve office space, conference rooms, or other space using an online reservation system. The online reservation system prevents double-booking of offices, conference rooms, etc. With the advent of the Metaverse and Web 3.0, employees may interact with colleagues in a virtual world. Although the Metaverse appears to be boundless, there are similar restrictions on virtual space as there are on physic space.

SUMMARY OF THE INVENTION

Systems and methods for virtual space reservation in the metaverse are disclosed. In one embodiment, a method for virtual space reservation in the metaverse may include: (1) receiving, at a virtual space scheduling computer program, a request for one of a plurality of virtual spaces in a virtual location in the metaverse or a web 3.0 location from a user electronic device associated with a user; (2) identifying, by the virtual space scheduling computer program, available virtual spaces and unavailable virtual spaces in the virtual location; (3) presenting, by the virtual space scheduling computer program, the available virtual spaces to the user electronic device; (4) presenting, by the virtual space scheduling computer program, a preview of one or more of the available virtual spaces to the user electronic device; (5) receiving, by the virtual space scheduling computer program, a selection of one of the available virtual spaces for the user from the user electronic device; (6) assigning, by the virtual space scheduling computer program, the selected virtual space to the user; and (7) granting, by the virtual space scheduling computer program, access to the selected virtual space to the user electronic device, wherein the user electronic device is presented with audio and visual properties for the selected virtual space.

In one embodiment, the virtual location may include a virtual office.

In one embodiment, the virtual space may include a virtual seat, a virtual desk, a virtual office, or a virtual meeting space.

In one embodiment, the virtual space scheduling computer program further presents unavailable virtual spaces to the user, and presents a preview of one or more of the unavailable virtual spaces to the user electronic device.

In one embodiment, each of the virtual spaces may be associated with a non-fungible token, wherein the non-fungible token may include a description of the virtual space.

In one embodiment, the method may also include: assigning, by the virtual space scheduling computer program, a value to each of the virtual spaces; and presenting, by the virtual space scheduling computer program, the value of one or more of the virtual spaces to the user electronic device.

In one embodiment, the method may also include identifying, by the virtual space scheduling computer program, a recommended virtual spaces for the user, wherein the recommendation may be based on historical virtual space usage the user, expected virtual space usage by team members or individuals with which the user is expected to interact, and/or the user's schedule.

In one embodiment, the virtual space scheduling computer program receives the recommendation from a trained machine learning engine.

According to another embodiment, a system may include: a virtual location in a metaverse/web 3.0 environment comprising a plurality of virtual spaces; a backend electronic device executing a virtual space scheduling computer program; and a user electronic device associated with a user executing user computer program. The virtual space scheduling computer program receives a request for one of the plurality of virtual spaces from the user computer program; identifies available virtual spaces and unavailable virtual spaces in the virtual location; presents the available virtual spaces to the user electronic device; and presents a preview of one or more of the available virtual spaces to the user computer program. The user computer program presents audio and visual properties for the one or more available virtual spaces. The virtual space scheduling computer program receives a selection of one of the available virtual spaces for the user from the user computer program; assigns the selected virtual space to the user; and grants access to the selected virtual space to the user computer program. The user computer program presents audio and visual properties for the selected virtual space.

In one embodiment, the virtual location may include a virtual office.

In one embodiment, the virtual space may include a virtual seat, a virtual desk, a virtual office, or a virtual meeting space.

In one embodiment, the virtual space scheduling computer program further presents unavailable virtual spaces to the user, and presents a preview of one or more of the unavailable virtual spaces to the user electronic device.

In one embodiment, each of the plurality of virtual spaces may be associated with a non-fungible token, wherein the non-fungible token may include a description of the virtual space.

In one embodiment, the virtual space scheduling computer program assigns a value to each of the virtual spaces and presents the value of one or more of the virtual spaces to the user electronic device.

In one embodiment, the virtual space scheduling computer program identifies a recommended virtual spaces for the user, wherein the recommendation may be based on historical virtual space usage the user, expected virtual space usage by team members or individuals with which the user is expected to interact, and/or the user's schedule.

In one embodiment, the virtual space scheduling computer program receives the recommendation from a trained machine learning engine.

According to another embodiment, a non-transitory computer readable storage medium, may include instructions stored thereon, which when read and executed by one or more computer processors, cause the one or more computer processors to perform steps comprising: receiving a request for one of a plurality of virtual spaces in a virtual location in the metaverse or a web 3.0 location from a user electronic device associated with a user, wherein the virtual location may include a virtual office; identifying available virtual spaces and unavailable virtual spaces in the virtual location, wherein the virtual space may include a virtual seat, a virtual desk, a virtual office, or a virtual meeting space; assigning a value to each of the virtual spaces; presenting the available virtual spaces and the values to the user electronic device; presenting a preview of one or more of the available virtual spaces to the user electronic device; receiving a selection of one of the available virtual spaces for the user from the user electronic device; assigning the selected virtual space to the user; and granting access to the selected virtual space to the user electronic device, wherein the user electronic device is presented with audio and visual properties for the selected virtual space.

In one embodiment, the virtual space scheduling computer program further presents unavailable virtual spaces to the user, and presents a preview of one or more of the unavailable virtual spaces to the user electronic device.

In one embodiment, each of the plurality of virtual spaces may be associated with a non-fungible token, wherein the non-fungible token may include a description of the virtual space.

In one embodiment, the non-transitory computer readable storage medium, may also include instructions stored thereon, which when read and executed by one or more computer processors, cause the one or more computer processors to identify a recommended virtual spaces for the user, wherein the recommendation may be based on historical virtual space usage the user, expected virtual space usage by team members or individuals with which the user is expected to interact, and/or the user's schedule using a trained machine learning engine.

According to another embodiment, a method for virtual space reservation in the metaverse may include: (1) receiving, at a virtual space scheduling computer program, a request for a virtual space in a virtual location in the metaverse or a web 3.0 location from a user; (2) identifying, by the virtual space scheduling computer program, available virtual spaces for the user; (3) receiving, by the virtual space scheduling computer program, a selection of one of the available virtual spaces for the user; (4) assigning, by the virtual space scheduling computer program, the selected virtual space to the user; and (5) granting, by the virtual space scheduling computer program, access to the selected virtual space to the user.

In one embodiment, the virtual location may include a virtual office.

In one embodiment, the virtual space may include a virtual seat, a virtual desk, a virtual office, or a virtual meeting space.

In one embodiment, each of the virtual spaces may be associated with a non-fungible token. The non-fungible tokens may include a description of the virtual space.

In one embodiment, the available virtual spaces may be identified based on a user qualification and/or a user need.

In one embodiment, the virtual space may be associated with audio and/or video properties.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Figure 1:
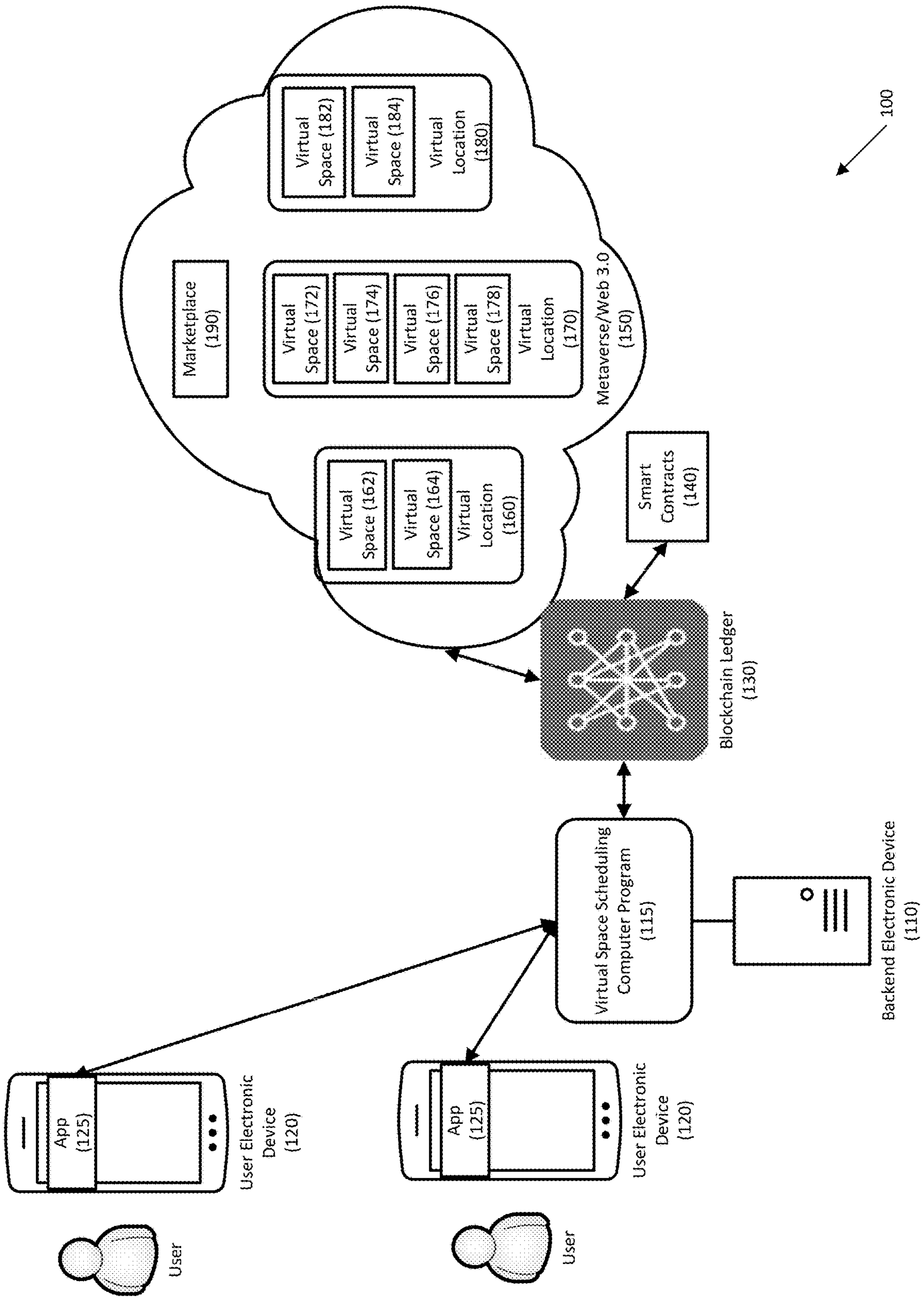
FIG. 1 illustrates a system for virtual space reservation in the metaverse according to one embodiment.

Embodiments are directed to systems and methods for virtual space reservation in the metaverse. Just like real-life offices, virtual locations, such as virtual offices, may be designated into a number of parcels. There may be a limit on how many parcels of virtual space are available, depending on the office platform, which may create scarcity in the same way that there may be a limited number of offices or desks available on a given office floor in an office in the physical world.

Virtual office spaces may create a feeling of physical presence that may encourage the exchange of information. A shared virtual space may also build and reinforce a shared culture as well, as a well-designed virtual space can create a sense of belonging, establish norms of behavior and reinforce trust among colleagues.

Embodiments may provide a mixed reality experience that enables people to interact with each other in person, regardless of geographic separation. Whether using it to host a virtual coffee break, conduct training, or host important all-hands meetings, embodiments provide a versatile, customizable, and scalable solution for bringing a geographically distributed workforce together.

Even if employees work in an "office setting," employees may still be working in multiple cities or on different continents. Thus, a virtual space may create a common experience for everyone whether they are working from home, from a satellite office, or from the main office. Customers, clients, visitors, etc. may be brought into these virtual spaces as a way to reduce the need to travel for meetings.

Embodiments may use a computer program for employees to reserve virtual space in virtual offices, cafes, and innovation spaces.

In one embodiment, the virtual spaces may be associated with non-fungible tokens (NFTs), so employees and their avatars can buy, sell, exchange, upgrade, etc. NFTs for the virtual spaces in a virtual marketplace for office seating. Each virtual space may have specific attributes that denote specific value that can be exchanged depending on the employee's needs for working.

The NFTs may have unique digital titles for the virtual spaces that may be stored on a blockchain ledger. For example, the NFTs may be assigned names similar to names that are used for physical offices (e.g., 23-10, representing office 10 on the $23^{rd}$ floor of a building).

Writing ownership of NFTs on a distributed ledger reduces the risk of harm due to fraud, and improves the ability of an owner to prove that they do, in fact, own a thing.

Embodiments may tokenize the virtual space for the entire asset (EA) or fractional ownership (FO). FO tokenization is fairly simple, and is similar to a crowdfunding platform or other similar structure that allows employees to earn shares. Each fractional owner may hold a number of tokens that represents shares in a line of business or organization and a product, depending on how it is structured.

EA tokenization, on the other hand, may require the virtual space to first be converted into an NFT. A new asset class may be created for the virtual space.

Like other NFTs, in embodiments, NFTs may be "purchased" or "earned" using, for example, cryptocurrency; they may be held in a digital wallet; they may be sold, traded, exchanged, etc. for a better desk or location to another employee for the value of the new desk, etc. The employee may have the right to severability, meaning that the NFTs may be traded or exchanged at any time that the employee wishes to do so. Employees may have a minimum hold time on a virtual space as the area/location becomes more popular.

NFTs for virtual spaces may provide traceable, secure records of ownership for a wide range of virtual office investments. NFTs may effectively speed real estate/seating assignment transactions that can often be complicated by the many layers of document verification or space planning/management involved.

In embodiments, the virtual space NFTs may be maintained using smart contracts. For example, the virtual space may be divided into parcels that may be referenced using unique x, y cartesian coordinates that map to a virtual office plan, such as a virtual office seating plan. Each NFT may include a record of its coordinates, its owner (e.g., an identifier such as an employee number), and a reference to a content description file or virtual space parcel manifest that describes and encodes the content the owner has on their virtual space.

The smart contract may register any changes to the state of the virtual space, such as a change in the contents of the desk or a transfer of ownership, to a blockchain ledger. The visual, audio, and three-dimensional content of the virtual office may be stored in a network of content servers. In one embodiment, any employee may submit a request to join a virtual office to a host, such as a server. A suitable blockchain network is an Ethereum-based network.

Embodiments may provide more flexibility in working arrangements, may save costs on physical space, and may allow for better collaboration. Employees may have several seating options in a virtual office, and by using NFTs or tokens for their virtual space, they can swap for or purchase a seat in their ideal working environment. This may help to increase productivity and allow the organization to know where their employees are located at any given time in the work week. The NFT will also be incentivized so that the more that a seat is booked, the more value the seat may hold, making it more desirable.

Embodiments may provide directional sound capabilities. Directional sound may make for a better virtual environment by simulating the audio characteristics of the physical world. For example, as a person or avatar walks away, his or her voice fades. If one person changes position in relation to another user, his or her voice changes direction as well. Other office sounds, such as the sounds of people walking down a hall, phone calls, etc. may be replicated in the virtual environment.

Embodiments may provide audio control features that controls the volume in certain settings. For example, conversations held at tables or other spaces may be visually enclosed in a color or ring so they may be private or open to only those in the color ring. These visual cues may be turned off to signal the start of a speaker or other presentation so that all that are present can hear the speaker.

Although embodiments may be described in the context of virtual space in offices, it should be recognized that embodiments have applicability to other environments, including entertainment environments (e.g., seats at a virtual concert or show), social contexts (e.g., seats at a virtual coffee shop or meeting space), etc.

Referring to FIG. 1, a system for seat reservation in the metaverse is disclosed according to an embodiment. System 100 may include one or more user electronic devices 120, such as computers (e.g., workstation, desktop, laptop, tablet, etc.), smart phones, Internet of Things (IoT) appliances, etc. User electronic devices 120 may execute one or more computer programs or applications 125, such as a scheduling application. Scheduling application 125 may interface with virtual space scheduling computer program 115 that may be executed by backend electronic device 110, such as a server (e.g., physical and/or cloud-based), computers, etc.

Virtual space scheduling computer program 115 may interface with metaverse or Web 3.0 150, which may maintain one or more virtual locations 160, 170, 180 such as virtual offices, virtual gathering spots, etc. Virtual locations 160, 170, 180 may include a plurality of virtual spaces 162, 164, 172, 174, 176, 178, 182, 184, such as virtual seats, virtual desks, virtual offices, virtual meeting rooms, etc. Each virtual space 162, 164, 172, 174, 176, 178, 182, 184 may be associated with a NFT or token, which may include a description of the respective virtual space (e.g., an x, y coordinate of the virtual space, a virtual space name, etc.). The NFTs or tokens may be written to a blockchain ledger 130, such as an Ethereum ledger, and may be managed by one or more smart contracts 140.

In one embodiment marketplace 190 may be provided where users may buy, sell, exchange, etc. their NFTs or tokens for virtual spaces 162, 164, 172, 174, 176, 178, 182, 184.

Smart contracts 140 may manage the ownership of the NFTs that represent virtual spaces 162, 164, 172, 174, 176, 178, 182, 184. Smart contract 140 may also control the virtual environment that is presented to the user based on the assigned or owned virtual space 162, 164, 172, 174, 176, 178, 182, 184. For example, each virtual space 162, 164, 172, 174, 176, 178, 182, 184 may have a different visual and audio properties. Smart contracts 140 may identify the virtual space 162, 164, 172, 174, 176, 178, 182, 184 and its properties and present that to the user.

In one embodiment, virtual space scheduling computer program 115 may present the user with recommendations for selection of virtual space 162, 164, 172, 174, 176, 178, 182, or 184. For example, virtual space scheduling computer program 115 may use machine learning to predict a virtual space to the user based on, for example, past selections, selections by members of the user's team, virtual space availability, etc. In one embodiment, smart contracts 140 may present a "preview" (e.g., present the visual and audio properties) for different virtual spaces for the user to select among. Once selected, smart contracts 140 may present the visual and audio properties for the selected virtual space.

In one embodiment, the user may select virtual space 162, 164, 172, 174, 176, 178, 182, or 184 using a graphic representation of virtual locations 160, 170, and/or 180.

In one embodiment, virtual space scheduling computer program 115 may also recommend whether a user should be physically present in an office, or should attend virtually. For example, virtual space scheduling computer program 115 may scrape the user's calendar may make a recommendation based on the type of meetings that the user may have (e.g., meetings, head's down time, etc.).

In embodiments, virtual space scheduling computer program 115 may determine a value for each virtual space 162, 164, 172, 174, 176, 178, 182, or 184 based on, for example, historical use. For example, if one virtual space is reserved more than others, it may have a higher price associated therewith. Other factors, such as a closeness to management, the ability to interact with others from the virtual space, etc. may be included in valuing the virtual space. Virtual space scheduling computer program 115 may rank the available virtual spaces according to the value. The user may then purchase a virtual space, may request a swap (the user with the higher valued virtual space may be compensated based on the difference in value), etc.

In one embodiment, virtual space scheduling computer program 115 may provide a space management computer program (not shown) with usage information so that additional virtual spaces can be spawned, whether users should be moved, etc.

Figure 2:
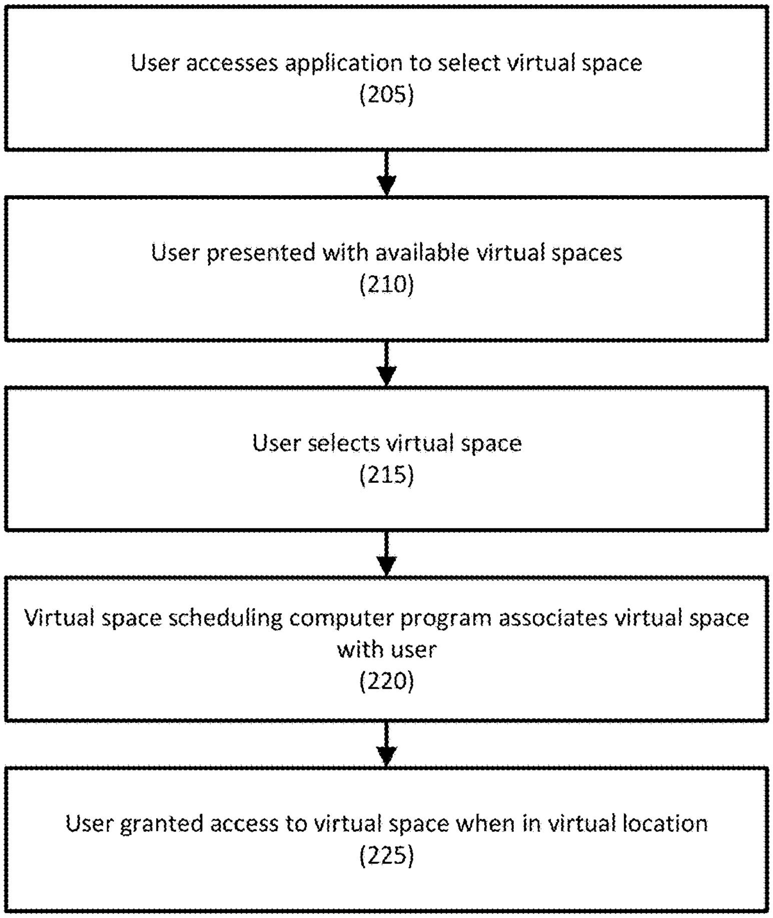
FIG. 2 depicts a method for virtual space reservation in the metaverse according to one embodiment.

Referring to FIG. 2, a method for seat reservation in the metaverse is disclosed according to an embodiment.

In step 205, a user, such as an employee, may access a program or application on a user electronic device to select a virtual space at a virtual location. An example of such as program or application is a virtual space scheduling computer program. For example, the user may access the program using a computer (e.g., desktop, laptop, notebook, tablet, etc.), a smart device (e.g., smart phone, smart watch), an Internet of Things appliance, a virtual reality headset, etc.

In step 210, a virtual space scheduling computer program in communication with the program or application may present the user with the available virtual spaces in the virtual location. The available virtual spaces may be filtered based on a user job, team, position, seniority, purpose for the virtual space, role, security level, entitlements, need, etc. In one embodiment, the user may also be presented with a cost for upgrading a virtual space. For example, the user may be presented with a cryptocurrency cost to upgrade.

In one embodiment, the virtual space scheduling computer program may present a recommendation for a virtual space to the user. The virtual space scheduling computer program may base the recommendation on historical usage data by the user, expected usage by team members or individuals with which the user is expected to interact, the user's schedule for the day, the type of anticipated use by the user (e.g., collaboration, head's down usage, etc.), any other user needs, the value of the virtual spaces, etc.

In one embodiment, the recommendation may be generated using artificial intelligence, such as a trained machine learning engine.

In one embodiment, the virtual space scheduling computer program may also present a recommendation as to whether the user should physically attend or virtually attend the office.

In one embodiment, the virtual space scheduling computer program may present a preview (e.g., visual and audio properties) for the virtual spaces so that the user may experience the virtual spaces before selection.

In one embodiment, the user may also be presented with virtual spaces that are reserved or occupied. In one embodiment, the virtual space scheduling computer program may assign each virtual space a score, such as popularity score, a usage score, etc., which may be based on the historical usage of the virtual space, demand for the virtual space, etc. The virtual space scheduling computer program may display the score for may be presented with the score for open and selected virtual spaces so that the user may engage the current occupant in order to swap or otherwise use the virtual space.

If desired, the user may then contact the reservation holder or the occupant by, for example, SMS message, email, etc. and may request a swap, may make a payment for the desired virtual space, etc.

In step 215, the user may select a virtual space. If necessary, the user may be charged a fee for upgrading or swapping with another employee who may hold a reservation for the virtual space.

In one embodiment, any fees may be transferred between the employees' digital wallets.

In step 220, the virtual space scheduling computer program may receive the user selection and may associate the selected virtual space with the user. For example, if the virtual space is associated with a NFT, the virtual space scheduling computer program may have a smart contract write the status of the NFT to a blockchain-based ledger.

In one embodiment, the ownership may be reflected in the employee's digital wallet.

In step 225, when the user accesses the virtual location, the user may be granted access to the assigned virtual space. In one embodiment, audio and/or visual properties for the assigned virtual space may be presented to the user. For example, a smart contract may present the visual and audio properties for the virtual space. The visual and audio properties may be based on employees associated with neighboring virtual spaces, other employees "walking" down hallways or entering other offices, etc.

Figure 3:
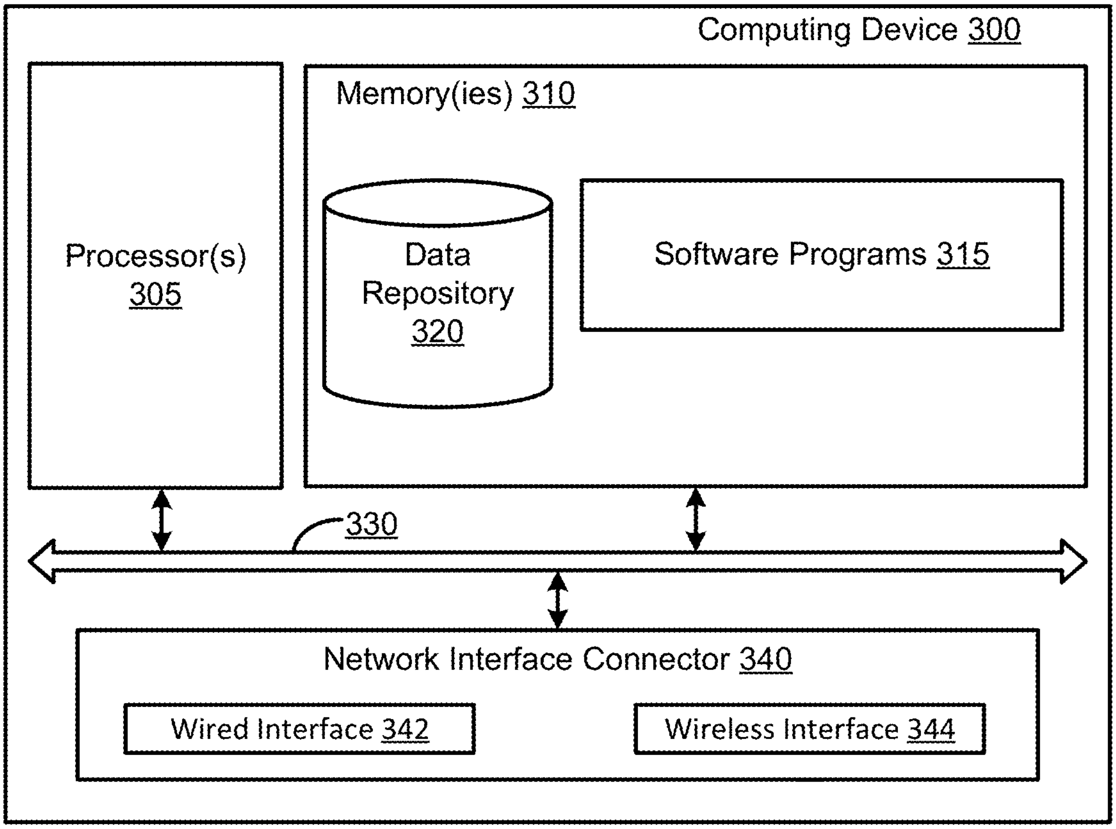
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Although several embodiments have been disclosed, it should be recognized that these embodiments are not exclusive to each other, and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for virtual space reservation in the metaverse, comprising:

receiving, at a virtual space scheduling computer program, a request for one of a plurality of virtual spaces in a virtual location in a metaverse location from a user electronic device associated with a user;

identifying, by the virtual space scheduling computer program, available virtual spaces and unavailable virtual spaces in the virtual location;

presenting, by the virtual space scheduling computer program, the available virtual spaces to the user electronic device;

presenting, by the virtual space scheduling computer program, a preview of one or more of the available virtual spaces to the user electronic device, the preview including visual and audio properties retrieved from a network of content servers;

receiving, by the virtual space scheduling computer program, a selection of one of the available virtual spaces for the user from the user electronic device;

associating, by the virtual space scheduling computer program, the selected virtual space with a non-fungible token having coordinates that map to a virtual office plan and a content description reference to a content description file that describes and encodes visual, audio, and three-dimensional content for the selected virtual space;

assigning, by the virtual space scheduling computer program, the selected virtual space to the user;

invoking, by the virtual space scheduling computer program, a smart contract to register a change to ownership or reservation state of the non-fungible token to a blockchain ledger by writing a status of the non-fungible token to the blockchain ledger; and granting, by the virtual space scheduling computer program, access to the selected virtual space to the user electronic device, wherein the smart contract controls a virtual environment of the virtual space that is presented to the user electronic device based on the change to ownership or reservation state of the non-fungible token, and wherein the smart contract identifies the selected virtual space and its visual and audio properties and presents the visual and audio properties for the selected virtual space to the user electronic device, wherein visual, audio, and three-dimensional content is stored in the network of content servers, and wherein the user electronic device is presented with audio and visual properties for the selected virtual space including directional sound that varies based on a position of an avatar within the virtual location such that, as the avatar changes position, a voice of the avatar fades and, if one person changes position in relation to the avatar, the voice of the avatar changes direction.

2. The method of claim 1, wherein the virtual location comprises a virtual office.

3. The method of claim 1, wherein the virtual space comprises a virtual seat, a virtual desk, a virtual office, or a virtual meeting space.

4. The method of claim 1, wherein the virtual space scheduling computer program further presents unavailable virtual spaces to the user, and presents a preview of one or more of the unavailable virtual spaces to the user electronic device.

5. The method of claim 1, wherein each of the virtual spaces is associated with a non-fungible token, wherein the non-fungible token comprises a description of the virtual space.

6. The method of claim 1, further comprising:

assigning, by the virtual space scheduling computer program, a value to each of the virtual spaces; and presenting, by the virtual space scheduling computer program, the value of one or more of the virtual spaces to the user electronic device.

7. The method of claim 1, further comprising:

identifying, by the virtual space scheduling computer program, a recommended virtual space for the user, wherein the recommendation is based on historical virtual space usage by the user, expected virtual space usage by team members or individuals with which the user is expected to interact, and/or a user's schedule.

8. The method of claim 1, wherein the virtual space scheduling computer program receives a recommendation from a trained machine learning engine.

9. A system, comprising:

a virtual location in a metaverse environment comprising a plurality of virtual spaces;

a backend electronic device executing a virtual space scheduling computer program; and a user electronic device associated with a user executing user computer program;

wherein:

the virtual space scheduling computer program receives a request for one of the plurality of virtual spaces from the user computer program;

the virtual space scheduling computer program identifies available virtual spaces and unavailable virtual spaces in the virtual location;

the virtual space scheduling computer program presents the available virtual spaces to the user electronic device;

the virtual space scheduling computer program presents a preview of one or more of the available virtual spaces to the user computer program;

the user computer program presents audio and visual properties for the one or more available virtual spaces, the preview including visual and audio properties retrieved from a network of content servers;

the virtual space scheduling computer program receives a selection of one of the available virtual spaces for the user from the user computer program;

the virtual space scheduling computer program associates the selected virtual space with a non-fungible token having coordinates that map to a virtual office plan and a content description reference to a content description file that describes and encodes visual, audio, and three-dimensional content for the selected virtual space;

the virtual space scheduling computer program assigns the selected virtual space to the user;

the virtual space scheduling computer program invokes a smart contract to register a change to ownership or reservation state of the non-fungible token to a blockchain ledger by writing a status of the non-fungible token to the blockchain ledger;

the virtual space scheduling computer program grants access to the selected virtual space to the user computer program, wherein the smart contract controls a virtual environment of the virtual space that is presented to the user computer program based on the change to ownership or reservation state of the non-fungible token; and the user computer program presents audio and visual properties for the selected virtual space, wherein the smart contract identifies the selected virtual space and its visual and audio properties and presents the visual and audio properties for the selected virtual space, wherein visual, audio, and three-dimensional content is stored in the network of content servers, wherein the user electronic device is presented with audio and visual properties for the selected virtual space including directional sound that varies based on a position of an avatar within the virtual location such that, as the avatar changes position, a voice of the avatar fades and, if one person changes position in relation to the avatar, the voice of the avatar changes direction.

10. The system of claim 9, wherein the virtual location comprises a virtual office.

11. The system of claim 9, wherein the virtual space comprises a virtual seat, a virtual desk, a virtual office, or a virtual meeting space.

12. The system of claim 9, wherein the virtual space scheduling computer program further presents unavailable virtual spaces to the user, and presents a preview of one or more of the unavailable virtual spaces to the user electronic device.

13. The system of claim 9, wherein each of the plurality of virtual spaces is associated with a non-fungible token, wherein the non-fungible token comprises a description of the virtual space.

14. The system of claim 9, wherein the virtual space scheduling computer program assigns a value to each of the virtual spaces and presents the value of one or more of the virtual spaces to the user electronic device.

15. The system of claim 9 wherein the virtual space scheduling computer program identifies a recommended virtual space for the user, wherein the recommendation is based on historical virtual space usage by the user, expected virtual space usage by team members or individuals with which the user is expected to interact, and/or a user's schedule.

16. The system of claim 9, wherein the virtual space scheduling computer program receives a recommendation from a trained machine learning engine.

17. A non-transitory computer readable storage medium, including instructions stored thereon, which when read and executed by one or more computer processors, cause the one or more computer processors to perform steps comprising:

executing a virtual space scheduling computer program;

receiving a request for one of a plurality of virtual spaces in a virtual location in a metaverse location from a user electronic device associated with a user, wherein the virtual location comprises a virtual office;

identifying available virtual spaces and unavailable virtual spaces in the virtual location, wherein the virtual space comprises a virtual seat, a virtual desk, a virtual office, or a virtual meeting space;

assigning a value to each of the virtual spaces;

presenting the available virtual spaces and the values to the user electronic device;

presenting a preview of one or more of the available virtual spaces to the user electronic device, the preview including visual and audio properties retrieved from a network of content servers;

receiving a selection of one of the available virtual spaces for the user from the user electronic device;

associating, by the virtual space scheduling computer program, the selected virtual space with a non-fungible token having coordinates that map to a virtual office plan and a content description reference to a content description file that describes and encodes visual, audio, and three-dimensional content for the selected virtual space;

assigning the selected virtual space to the user;

invoking, by the virtual space scheduling computer program, a smart contract to register a change to ownership or reservation state of the non-fungible token to a blockchain ledger by writing a status of the non-fungible token to the blockchain ledger; and granting access to the selected virtual space to the user electronic device, wherein the smart contract controls a virtual environment of the virtual space that is presented to the user electronic device based on the change to ownership or reservation state of the non-fungible token, and wherein the smart contract identifies the selected virtual space and its visual and audio properties and presents the visual and audio properties for the selected virtual space to the user electronic device, wherein visual, audio, and three-dimensional content is stored in the network of content servers, wherein the user electronic device is presented with audio and visual properties for the selected virtual space including directional sound that varies based on a position of an avatar within the virtual location such that, as the avatar changes position, a voice of the avatar fades and, if one person changes position in relation to the avatar, the voice of the avatar changes direction.

18. The non-transitory computer readable storage medium of claim 17, wherein the virtual space scheduling computer program further presents unavailable virtual spaces to the user, and presents a preview of one or more of the unavailable virtual spaces to the user electronic device.

19. The non-transitory computer readable storage medium of claim 17, wherein each of the plurality of virtual spaces is associated with a non-fungible token, wherein the non-fungible token comprises a description of the virtual space.

20. The non-transitory computer readable storage medium of claim 17, further including instructions stored thereon, which when read and executed by one or more computer processors, cause the one or more computer processors to perform steps comprising:

identifying a recommended virtual space for the user, wherein the recommendation is based on historical virtual space usage by the user, expected virtual space usage by team members or individuals with which the user is expected to interact, and/or a user's schedule using a trained machine learning engine.

* * * * *